Dec. 19, 1961   E. A. CALDWELL, JR   3,013,695
SPREADING METHOD AND APPARATUS
Filed Oct. 12, 1960

INVENTOR
Europe A. Caldwell, Jr.

BY  *Beale and Jones*
ATTORNEYS

United States Patent Office 3,013,695
Patented Dec. 19, 1961

3,013,695
SPREADING METHOD AND APPARATUS
Europe A. Caldwell, Jr., Box 1327, Baton Rouge, La.
Filed Oct. 12, 1960, Ser. No. 62,115
8 Claims. (Cl. 222—1)

This invention relates to the art of spreading dry, pulverulent material on the ground, and is of particular value in highway construction in spreading a uniform layer of dry hydraulic cement upon the earth, to be mixed therewith in constructing soil-cement roadways.

In accordance with the best practice prior to the present invention, dry hydraulic cement has been transported from the cement mills, usually in pneumatically loaded and unloaded bulk trucks or semitrailers, to the user's storage bins or silos, and there pneumatically unloaded into the bins. As needed, the cement is then loaded into dump trucks which carry it to spreaders, which spread it on the ground as they are towed.

This prior art method and apparatus have certain disadvantages and are unsatisfactory in certain ways. Considerable handling of the cement is required, with consequent high labor costs, sizable inventories must be maintained by the user, and the storage and handling facilities require substantial capital investment. There are other inherent disadvantages. The discharge gates of dump trucks are so low that it is impracticable to arrange gravity flow of the cement over the entire width of the spreader, making extra hand labor necessary to shovel the cement dumped into the spreader so as to cover the entire bottom of the spreader's hopper, which must be done if the material is to be spread across the full width of the spreader. Furthermore, non-uniform hand spreading in the spreader hopper causes uneven spreading on the ground, resulting in a cement-soil roadway with weak spots. The spreader cannot be operated at maximum speed due to the limitations imposed by the dump trucks and hand labor. Even with careful handling, the material dumped into the spreaders is not always in the most desirable or optimum condition for spreading, i.e. it is not in an ideal uniform, free-flowing, fluffy condition, resulting in some non-uniformity of distribution as the material is spread, with consequent non-uniformity of the soil-cement roadway.

One object of the present invention is to overcome the above-mentioned difficulties and deficiencies. Another object is to provide method and means for more rapid, and more uniform and accurately controlled distribution of dry pulverulent material on the ground. Another object is to provide method and means for producing soil-cement roadways of improved quality, and at lower cost. Another object is to eliminate the need for manual handling or shoveling of the material, and to provide means whereby distribution is effected almost automatically, by simply pulling the apparatus over the ground and manipulating certain valves. Another object is to eliminate the need for users' fixed storage facilities for powdered dry cement, by making it feasible and economical to load the material into bulk carriers at the cement-producing mills, and then unload them at the site concurrently with spreading the material.

In accordance with the invention a bulk supply of dry pulverulent material is moved over the ground, above or alongside a strip of ground to be covered, in a pneumatic unloading tank; the material, which is too compacted in the tank for efficient spreading, is withdrawn gradually and carried away suspended in a gaseous stream; the material is separated from the gaseous stream, preferably in a cyclone separator, in a fluffy, free-flowing condition; and the material is then deposited on the ground by spreading apparatus into which the separator discharges, which apparatus moves over the ground adjacent the bulk supply, and which may be towed by the conveyance carrying the bulk supply, or moved by other convenient means. For carrying a bulk supply, a conventional pneumatic unloading semi-trailer, loaded at the cement-producing mill preferably is used.

Further in accordance with the invention there is provided a novel spreader comprising means for receiving a gaseous current containing entrained material to be spread, a separator, preferably of the cyclone type, and means for properly distributing the material discharged therefrom into the spreader hopper, the actual spreading means being of any suitable type.

Other objects and advantages of the invention will be apparent from the following description and from the appended drawings, in which.

Figure 1:
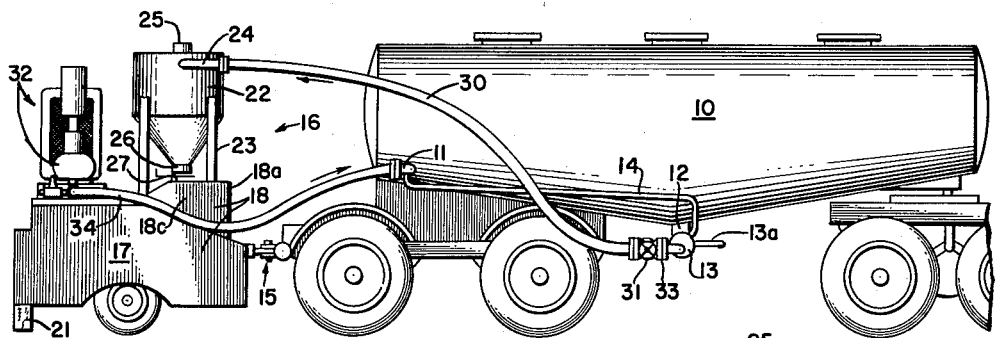
FIG. 1 is a schematic view in side elevation of apparatus illustrating the preferred embodiment of my invention.
Figure 3:
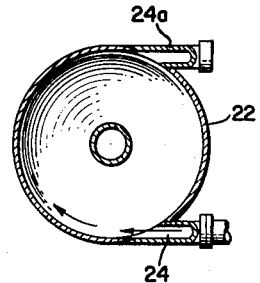
FIG. 3 is a section taken on line 3—3 of FIG. 2.

Referring now to the drawings, in which like characters indicate the same or similar ports, FIG. 1 shows, schematically, a closed pneumatic unloading bulk tank or receptacle 10 of well-known type which is widely used for transportating dry pulverulent hydraulic cement on a truck or semi-trailer. For discharging its contents tank 10 has an air inlet connection 11, which connects inside with suitable outlets (not shown) adjacent the top of the tank, to pressurize tank and put a discharge pressure on the contents, and an outlet pipe 12 leading from a discharge aperture in the bottom, an air-cement proportioning valve 13 in outlet pipe 12, and an air supply line 14 from pipe 11 to valve 13. By means of reducing valve means (not shown) in line 14 or valve 13, the air thus supplied to valve 13 is at a lower pressure than in tank 10. Quick-connect couplings are provided at the outer ends of pipes 11 and 12 for coupling with supply and discharge pipes respectively. When air is pumped in through the supply pipe and inlet pipe 11, tank 10 is pressurized, forcing powdered cement through the discharge aperture to valve 13. At the same time air is supplied to this valve through air supply line 14. A control handle 13a on valve 13 permits controlling the output mixture to any proportion between all air from line 14, in the so-called "closed" position of the valve to, in the so-called "full open" position, the full supply of air plus to maximum output from the tank 10 through its discharge orifice or aperture. As well known, in the use of this prior art equipment, valve 13 is adjusted to generate a current of air carrying a stream of the powdered material in suspension.

Figures 2, 4:
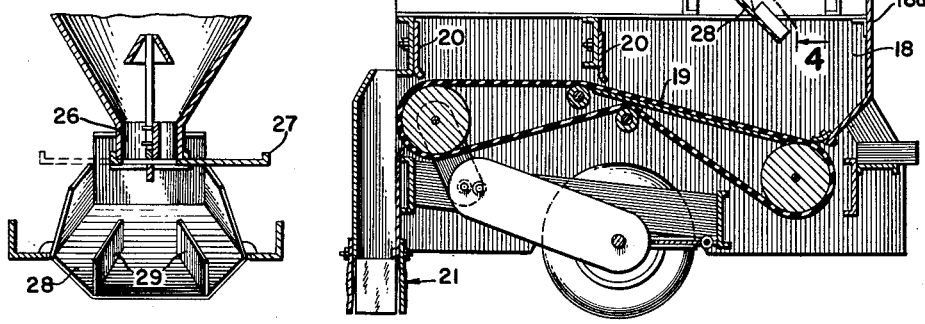
FIG. 2 is an enlarged longitudinal section of the spreader shown in FIG. 1.
FIG. 4 is a fragmentary section taken on line 4—4 of FIG. 2.
Figure 5:
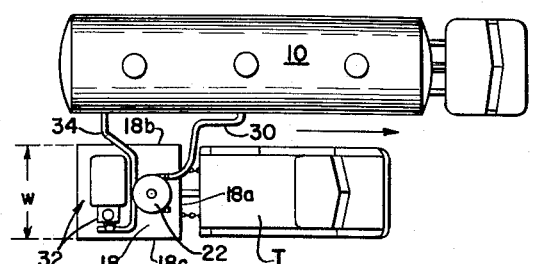
FIG. 5 is a schematic plan view showing another way of using my novel apparatus.

Traction means not indicated is provided for moving tank 10 over the ground. A suitable tow hitch, indicated schematically at 15, provides means for towing a spreader apparatus, generally designated 16. This apparatus comprises a suitable known spreader 17 modified by the addition of vertical walls 18a, 18b, and 18c (see FIG. 1, around the front or right-hand portion as seen in FIG. 1, to provide the spreader with an enlarged receptacle, hopper, or surge box 18, which is of much smaller capacity than receptacle 10. As spreader 17 is moved over the ground, material supplied to hopper 18 is carried to the rear by a ground-wheel-driven endless belt 19 (FIG. 2) in a layer, the thickness of which is determined by adjustable strike-off plates 20, the material falling to the ground through a flexible skirt 21 at the rear, which reaches nearly to the ground to minimize dust. Hopper 18 and belt 19 extend substantially the full width of spreader 17, as may be understood from reference to FIG. 5, which shows a plan view of spreader 17 being towed by a separate truck T alongside tank 10, instead of behind tank 10 as in FIG. 1. Hopper 18 extends the full width between walls 18b and 18c. Belt 19 extends the full width also, and when it is properly covered it spreads a strip having the width w. The quantity of material spread per square foot, assuming that the hopper is uniformly filled to a sufficient depth, depends upon the density of the material in the hopper, the setting of strike-off plates 20, the speed of the spreader over the ground, and the relative speed of belt 19. However, it will be seen that a substantially uniform layer will be spread on the ground independently of the speed of the spreader, because the belt is driven by the wheels and therefore discharges the material at a rate which is at all times proportional to the speed of the spreader. For each small increment of distance moved by the spreader the same amount of material is discharged onto the ground.

As mentioned above, one of the difficulties of spreading a uniform layer with prior art apparatus has been due to the low level at which the material has been delivered to the spreader by dump trucks, making it necessary to rely on human attention and skill in shovelling the material uniformly over the width of the hopper. Also, in the prior art, the dry cement is not delivered in the optimum, uniform, light, fluffy condition for spreading. These difficulties are inherent not only in the dump truck method of delivery to the spreader, but also in all other known methods used in the art. This is also true regardless of the type of spreader used. In accordance with my invention I provide novel method and apparatus for overcoming these difficulties and resulting deficiencies. This is done essentially by providing an improved method of delivering the material to the spreader, so that it is delivered thereto in the optimum condition for spreading, and by delivering the material at a point sufficiently high so that it may be caused to flow by gravity to keep the floor of the hopper, which is defined in the illustrated spreader by the top of belt 19, adequately covered at all times.

Referring again to the drawings for an explanation of how this is done a cyclone separator 22 is mounted on spreader 17 above hopper or surge box 18 by means of suitable supports 23. It is of generally conventional design and operates in well known manner, having a cylindrical main portion, a conical lower portion, a tangential inlet 24 near the top, a central air outlet 25 at the top, and a central outlet 26 at the bottom for the separated material. Outlet 26 is spaced well above the bottom of hopper 18, which is defined by the top of belt 19, and preferably is provided with a valve 27 to shut off the flow of material from the separator when desired. Below the outlet 26 an inclined distributor plate or deflecting means 28, having suitable guide means 29 (FIG. 4), is disposed for distributing material discharged from separator 22 across the full width of hopper 18.

A supply hose 30 is connected at one end to separator inlet 24. At its other end it is provided with a quick-connect coupling 33 for connection with the outer end of outlet pipe 12 of bulk tank 10. Either in inlet pipe 24 or in supply pipe 30, preferably in the latter adjacent its quick-connect coupling with the outlet pipe 12, there is provided a quick-acting valve 31, preferably a butterfly valve, for use in quickly shutting off the supply of material.

To eliminate the necessity for providing a pump on each bulk tank truck, an air pump 32 with suitable motor is mounted on spreader 17. It has an air outlet with the usual pressure relief valve and a connection for one end of an air supply hose 34. The other end of pipe 34 has a quick-connect coupling for connection with the outer end of inlet pipe 11 of the tank 10.

Referring to FIG. 4, it will be noted that a second inlet 24*a* is provided on the left side of separator 22, for ease of connection with bulk trucks having their discharge outlets on the left side, or for use as illustrated in FIG. 5. The inlet not being used is closed with a suitable cover.

FIG. 5 shows how the apparatus may be arranged for spreading alongside heavy bulk tank 10, in situations in which the ground is too soft for the load imposed by the bulk tank 10 and its truck or trailer.

In operation, the connections having been made as described, valve 27 being closed and valve 31 opened, air pump 32 is started, and pressure is built up in tank 10. Valve 13 is adjusted to get the desired quantity of material in suspension in the current of air which carries it to separator 22. There the air is separated and escapes at 25. As soon as material builds up sufficiently on valve 27 it is opened, and the material flows from discharge 26 onto deflecting and distributing means 28 which distributes it laterally in hopper or surge box 18. As soon as hopper 18 is filled the tractor means (not indicated in FIG. 1) moves forward, the spreader distributing the material uniformly on the ground as described above, the valves thereafter being adjusted if necessary to maintain a proper flow. Hopper 18 is of sufficient depth to keep belt 19 covered the full width at all times, to get a "surge box" effect, i.e. a sufficient quantity in the hopper to take care of fluctuations in supply, as when starting up and stopping.

At the end of the spreading run, discharge regulator valve 13 is shifted to the "closed" or "straight air" position, and discharge line 30 is cleared of material. Valve 27 is closed before cyclone 22 is completely cleared of material, to avoid air blast into surge box 18. Unless spreading is to be continued shortly, or if tank 10 has been emptied, pump 32 is stopped. Quick acting valve 31 is used when needed to stop the flow of material from tank 10 quickly.

Operation with the equipment arranged as shown in FIG. 5 is the same as above.

Numerous changes within the scope of the appended claims will be apparent to those skilled in the art. The spreading apparatus instead of being towed by or adjacent to the vehicle carrying tank 10, may be disposed on the same vehicle.

Other known separators may be used instead of the cyclone type.

I claim:

1. A vehicle for depositing a layer of dry pulverulent material on the ground from a supply thereof delivered to said vehicle in a stream of conveying gas as said vehicle moves over the ground, comprising a hopper having a broad relatively thin discharge outlet, means for discharging said material through said outlet in a broad relatively thin stream and depositing it on the ground in a broad relatively thin layer as said vehicle moves over the ground, a separator for separating said material from said gas, an aperture in said separator for delivering said stream of conveying gas with said supply of material thereinto, and means for discharging the separated material from said separator into said hopper across the full width of said discharge outlet.

2. A vehicle as defined by claim 1, said vehicle being supported on the ground by wheels, said means for discharging said material through said outlet in a broad relatively thin stream and depositing it on the ground in a broad relatively thin layer as said vehicle moves over the ground comprising an endless conveyor belt driven by said wheels as said vehicle moves over the ground, said conveyor belt having an upper reach portion disposed below said discharge outlet.

3. A vehicle as defined by claim 1, comprising an air pump for supplying gas to form said stream, said gas being air.

4. A vehicle as defined by claim 1, said hopper having a width, measured perpendicularly to the direction of motion of said vehicle, which is substantially equal to the width of the layer deposited on the ground, said vehicle comprising deflecting means between said separator and said hopper for spreading the material from said separator laterally across the width of said hopper.

5. Means for depositing dry pulverulent material on the ground in a layer, comprising a mobile storage receptacle for moving a large supply of said material over the ground, said receptacle having a bottom wall with a discharge aperture therein, said material in said receptacle immediately over and adjacent said aperture being compacted, a hopper having a broad relatively thin discharge outlet movable over the ground adjacent said receptacle, means for moving said receptacle and said hopper over the ground adjacent each other, means for creating a gaseous current out of said receptacle through said aperture to loosen the material in said receptacle adjacent said aperture and convey it gradually out of said receptacle entrained in said current, a separator for separating said entrained material from said current and depositing the separated material in said hopper across the full width of said discharge outlet in a loose, free-flowing condition, means for conducting said gaseous current with entrained material from said aperture to said separator, and means for discharging the separated material from said hopper through said discharge outlet and depositing it on the ground in a broad relatively thin layer as said receptacle and hopper move over the ground.

6. Means for depositing dry pulverulent material on the ground as defined by claim 5, comprising a ground-wheel supported vehicle separate from said mobile storage receptacle, said vehicle having mounted thereon said hopper, said separator, and said means for depositing the material from said hopper on the ground.

7. Means for depositing dry pulverulent material on the ground in a layer as defined by claim 6, comprising an air pump mounted on said vehicle for supplying air under pressure to said receptacle to form said gaseous current.

8. The method of depositing a layer of dry pulverulent material on the ground comprising the steps of (1) moving a load of said material longitudinally over the ground adjacent a similarly moving receptacle having a transversely disposed broad relatively thin discharge outlet, and during this longitudinal movement of the load and receptacle performing the following additional steps: (2) withdrawing material from said load in a stream of conveying gas, (3) separating said material from said stream and depositing it in said receptacle in free flowing condition, distributing said material across the full transverse width of said outlet (4) and discharging the separated material from said receptacle onto the ground through said outlet, so that it falls on the ground in a broad relatively thin stream as said load and receptacle move over the ground.

References Cited in the file of this patent

UNITED STATES PATENTS

| | | |
|---|---|---|
| 313,028 | Sprinkel | Feb. 24, 1885 |
| 1,150,286 | Middlestate | Aug. 17, 1915 |
| 1,173,073 | Williams | Feb. 22, 1916 |
| 1,385,870 | Gieseler | July 26, 1921 |
| 1,417,052 | Gastiger | May 23, 1922 |
| 1,544,438 | Fetter | June 30, 1925 |
| 2,059,548 | Broome | Nov. 3, 1936 |
| 2,068,164 | Cadwell | Jan. 19, 1937 |
| 2,261,934 | Flynn | Nov. 11, 1941 |
| 2,455,701 | Putman et al. | Dec. 7, 1948 |
| 2,589,968 | Schemm | Mar. 18, 1952 |
| 2,691,923 | Huck | Oct. 19, 1954 |
| 2,700,535 | Harrington et al. | Jan. 25, 1955 |
| 2,779,510 | Wilson et al. | Jan. 29, 1957 |
| 2,783,918 | Bramblett | Mar. 5, 1957 |
| 2,830,510 | Mariani et al. | Apr. 15, 1958 |
| 2,865,521 | Fisher et al. | Dec. 23, 1958 |

FOREIGN PATENTS

| | | |
|---|---|---|
| 428,298 | Great Britain | May 10, 1935 |